(12) United States Patent
Israel Vijayponraj et al.

(10) Patent No.: US 11,714,776 B2
(45) Date of Patent: Aug. 1, 2023

(54) ENABLING A MULTI-CHIP DAISY CHAIN TOPOLOGY USING PERIPHERAL COMPONENT INTERCONNECT EXPRESS (PCIE)

(71) Applicant: TEXAS INSTRUMENTS INCORPORATED, Dallas, TX (US)

(72) Inventors: Kishon Vijay Abraham Israel Vijayponraj, Bengaluru (IN); Sriramakrishnan Govindarajan, Bengaluru (IN); Mihir Narendra Mody, Bengaluru (IN)

(73) Assignee: Texas Instmments Incorporated, Dallas, TX (US)

( * ) Notice: Subject to any disclaimer, the term of this patent is extended or adjusted under 35 U.S.C. 154(b) by 16 days.

(21) Appl. No.: 17/564,975

(22) Filed: Dec. 29, 2021

(65) Prior Publication Data
US 2023/0041617 A1 Feb. 9, 2023

(30) Foreign Application Priority Data
Aug. 5, 2021 (IN) .............................. 202141035280

(51) Int. Cl.
*G06F 13/42* (2006.01)
*G06F 9/4401* (2018.01)
*G06F 13/40* (2006.01)
*G06F 12/1027* (2016.01)

(52) U.S. Cl.
CPC ...... *G06F 13/4247* (2013.01); *G06F 12/1027* (2013.01); *G06F 13/4022* (2013.01); *G06F 2213/0024* (2013.01); *G06F 2213/0026* (2013.01); *G06F 2213/0038* (2013.01)

(58) Field of Classification Search
None
See application file for complete search history.

(56) References Cited

U.S. PATENT DOCUMENTS

| | | | |
|---|---|---|---|
| 8,122,177 B1* | 2/2012 | Puranik | G06F 13/28 710/316 |
| 11,354,258 B1* | 6/2022 | Kaplan | G06F 13/1663 |
| 11,467,992 B1* | 10/2022 | Kaplan | G06F 3/0673 |
| 2007/0189299 A1* | 8/2007 | Gulati | G06F 13/4247 370/428 |
| 2018/0167307 A1* | 6/2018 | Barry | H04L 49/101 |

(Continued)

*Primary Examiner* — Hyun Nam
(74) *Attorney, Agent, or Firm* — Brian D. Graham; Frank D. Cimino

(57) ABSTRACT

A system-on-chip (SoC) may be configured to enable a Multi-Chip Daisy Chain Topology using peripheral component interface express (PCIe). The SoC may include a processor, a local memory, a root complex operably connected to the processor and the local memory, and a multi-function endpoint controller. The root complex may obtain forwarding information to configure routing of transactions to one or more PCIe endpoint functions or to the local memory. The root complex may initialize, based on the forwarding information, access between a host and the one or more PCIe endpoint functions. The multi-function endpoint controller may obtain a descriptor and endpoint information to configure outbound portals for transactions to at least one remote host. The multi-function endpoint controller may establish a communication path between the host and a function out of a plurality of functions.

20 Claims, 14 Drawing Sheets

(56) References Cited

U.S. PATENT DOCUMENTS

2020/0387470 A1\* 12/2020 Cui ................. G06F 21/78
2021/0320886 A1\* 10/2021 Kasichainula ........ G06F 13/385
2022/0138058 A1\* 5/2022 Govindarajan ..... G06F 11/1625
714/10
2023/0041617 A1\* 2/2023 Israel Vijayponraj ....................
G06F 12/1027

\* cited by examiner

ENABLING A MULTI-CHIP DAISY CHAIN TOPOLOGY USING PERIPHERAL COMPONENT INTERCONNECT EXPRESS (PCIE)

CROSS-REFERENCE TO RELATED APPLICATIONS

This application claims priority to India Provisional Application 202141035280, filed Aug. 5, 2021, titled "Enabling Multi-Chip Daisy Chain Topology Using PCIE," which is hereby incorporated by reference in its entirety.

BACKGROUND

Computing systems may include a host in communication with a number of endpoints. Endpoints may include single-function endpoints and multi-function endpoints. Single-function endpoints perform a single function (e.g., an ethernet adaptor). Multi-function endpoints perform multiple functions using the same physical link to the host via a bus. A multi-function endpoint may include, for example, universal serial bus (USB) and serial advance technology attachment (SATA) communications. Endpoint functions may include physical functions (PFs) (e.g., ethernet, USB, and SATA communications) and may also include virtual functions, which represent predefined slices of physical resources. For example, an endpoint may be a graphics processing unit (GPU) and a virtual function may be used to represent frame buffer memory and cores of the GPU.

There are a number of protocols and standards for communication between a host and an endpoint. One such standard is the Peripheral Component Interconnect Express (PCIe) standard.

SUMMARY

In general, in one aspect, embodiments disclosed herein relate to a system-on-chip (SoC) configured to enable a Multi-Chip Daisy Chain Topology using peripheral component interconnect express (PCIe). The SoC includes a processor, a local memory, a root complex operably connected to the processor and the local memory, and a multi-function endpoint controller. The root complex obtains forwarding information to configure routing of transactions to one or more PCIe endpoint functions or to the local memory. The root complex initializes, based on the forwarding information, access between a host and the one or more PCIe endpoint functions. The multi-function endpoint controller obtains a descriptor and endpoint information to configure outbound portals for transactions to at least one remote host. The multi-function endpoint controller establishes a communication path between the host and a function out of a plurality of functions.

In general, in one aspect, embodiments disclosed herein relate to a device including various SoCs configured to enable a Multi-Chip Daisy Chain Topology using peripheral component interconnect express (PCIe). Each respective SoC includes a processor, a local memory, a root complex operably connected to the processor and the local memory, and a multi-function endpoint controller. The root complex obtains forwarding information to configure routing of transactions to one or more PCIe endpoint functions or to the local memory. The root complex initializes, based on the forwarding information, access between a host and the one or more PCIe endpoint functions. The multi-function endpoint controller obtains a descriptor and endpoint information to configure outbound portals for transactions to at least one remote host. The multi-function endpoint controller establishes a communication path between the host and a function out of a plurality of functions.

In general, in one aspect, embodiments disclosed herein relate to a method for enabling a Multi-Chip Daisy Chain Topology using peripheral component interconnect express (PCIe). The method includes obtaining, by a root complex operably connected to a processor and a local memory, forwarding information to configure routing of transactions to one or more PCIe endpoint functions or to the local memory. The method includes initializing, by the root complex and based on the forwarding information, access between a host and the one or more PCIe endpoint functions. The method includes obtaining, by a multi-function endpoint, a descriptor and endpoint information to configure outbound portals for transactions to at least one remote host. The method includes establishing a communication path between the host and a function out of a plurality of functions. The forwarding information includes a PCIe address indicating whether a transaction is directed to the one or more PCIe endpoint functions or the local memory.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

In one or more embodiments, computing system applications may include a host (e.g., a Peripheral Component Interconnect Express (PCIe) host) in communication with a number of endpoints (e.g., PCIe endpoints). The endpoints may include single-function endpoints and multi-function endpoints. In applications involving communication between multiple chips, the host and the endpoints may be configured in a Peripheral Component Interconnect Express (PCIe) topology. The PCIe topology may be implemented using a multi-function PCIe endpoint controller integrated in a system-on-chip (SoC). In some embodiments, network standards other than PCIe may be used. The PCIe topology may be implemented with multiple SoCs connected with each other and with each SoC integrating a respective multi-function PCIe endpoint controller.

In some embodiments, communication between multiple SoCs may be implemented in a multi-chip daisy chain topology using the PCIe. To allow for direct communication between multiple SoCs, a host in a first SoC may access an endpoint in a second SoC. An SoC with a multi-function PCIe endpoint controller may include a centralized transaction tunneling unit that isolates communications between the host and the endpoint such that secure communication paths may be established between the SoCs.

Figure 1:
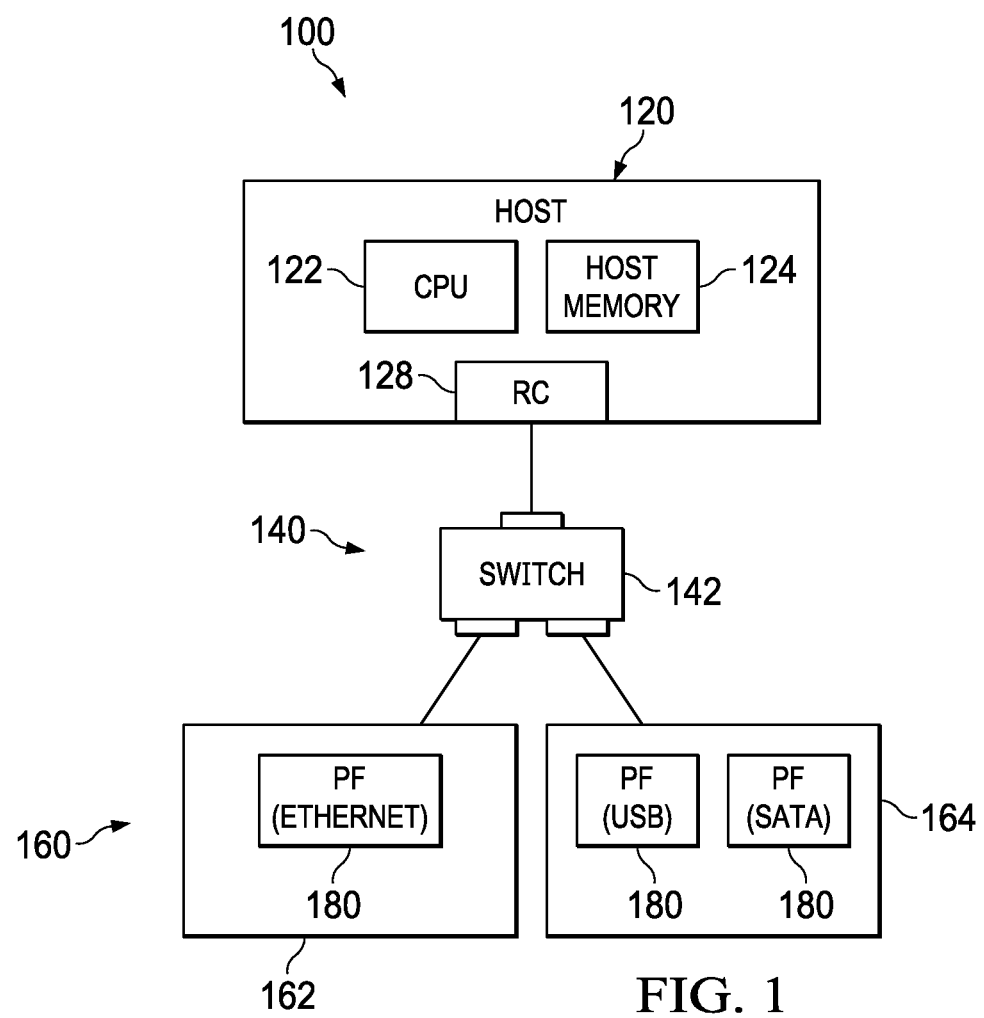
FIG. 1 is a block diagram illustrating a Peripheral Component Interconnect Express (PCIe) topology in accordance with one or more embodiments.

FIG. 1 is a diagram of a PCIe system 100 in accordance with one or more embodiments. As shown in FIG. 1, the PCIe system 100 includes a host 120 connected to one or more PCIe endpoints 160 (e.g., an endpoint (EP) or multiple endpoints) via a PCI bus 140. The host 120 includes one or more processors 122 (e.g., a processor or central processing unit (CPU)) and a host memory 124.

The PCI bus 140 may implement a switch fabric and include one or more switch devices 142 enabling multiple endpoints 160 (e.g., PCIe endpoints 160) to communicate with the host 120. In the PCIe system 100, the host 120 includes a root complex (RC) 128 that connects the processor 122 and the host memory 124 to the PCI bus 140.

In the example of FIG. 1, the endpoints 160 include one or more single function EP 162 and one or more multi-function EP 164. The single function EP 162 performs a single function 180. The single function EP 162 may be, for example, an ethernet adaptor. A multi-function EP 164 performs multiple (two or more) functions 180 and uses the same physical link to the host 120 via the PCI bus 140. The multi-function EP 164 may include, for example, universal serial bus (USB) and serial advance technology attachment (SATA) communications.

Endpoint (EP) functions 180 may include physical functions (PFs) (e.g., ethernet, USB, and SATA communications) and may also include virtual functions, which represent predefined slices of physical resources. For example, the endpoints 160 may be a graphics processing unit (GPU) and a virtual function may be used to represent frame buffer memory and cores of the GPU.

The functions 180 performed by each of the endpoints 160 may be fixed. For example, the endpoints 160 may be a PCIe USB card that provides a USB port and enables the host 120 to communicate with a USB peripheral connected via the USB port.

In contrast to fixed-function endpoints, the endpoints 160 may be integrated into a system on chip (SoC) that is dynamically reconfigured to perform different functions 180. The SoC is an integrated circuit that includes all or most components on the integrated circuit. In FIG. 1, the SoC may include a processor, a memory, various input/output ports, or a secondary storage.

Figure 2A:
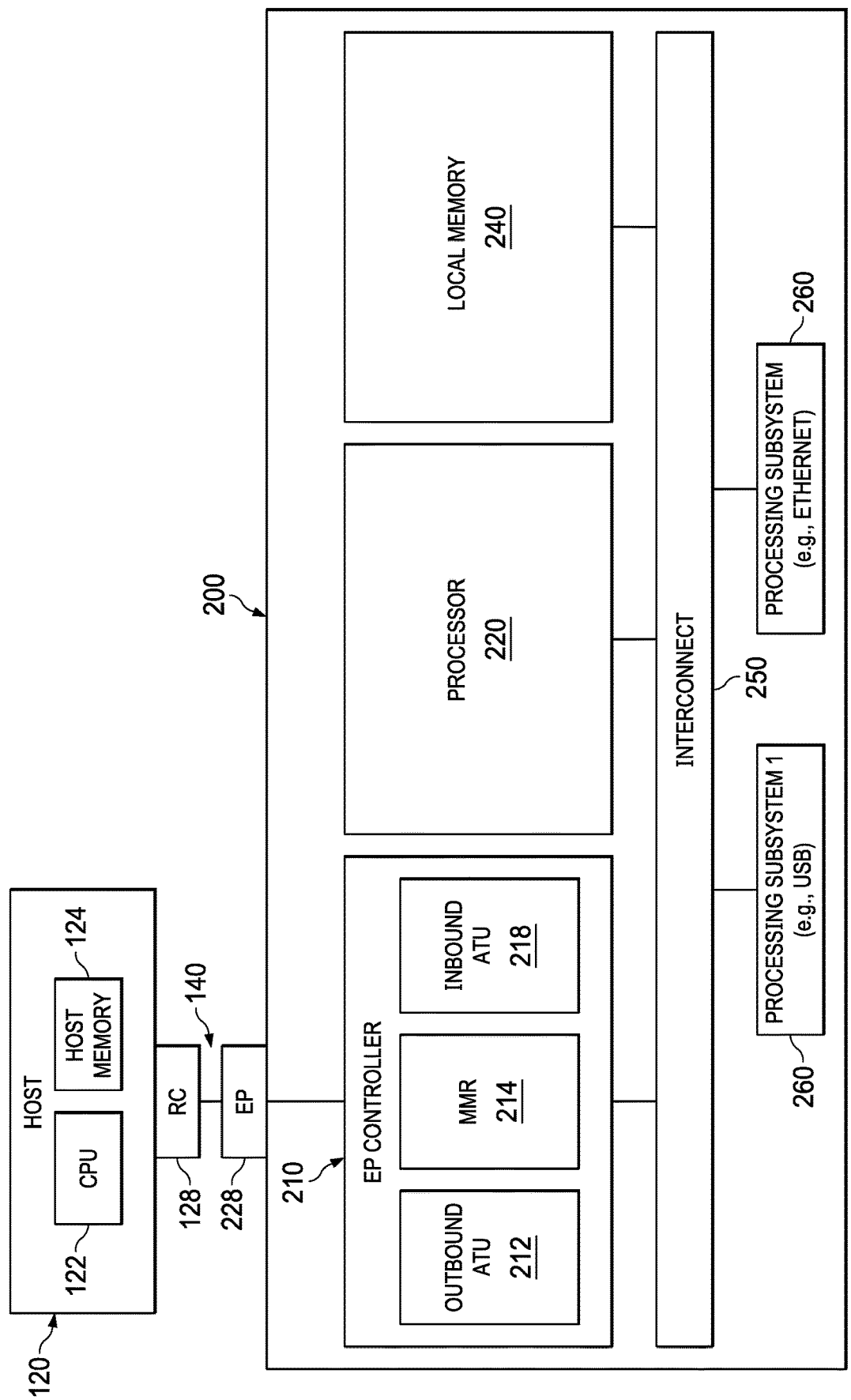
FIGS. 2A through 2C are diagrams illustrating a multi-function PCIe endpoint controller integrated in a system-on-chip (SoC) in accordance with one or more embodiments.

FIG. 2A is a diagram of a multi-function endpoint controller integrated in an SoC 200 in accordance with one or more embodiments. As shown in FIG. 2A, the SoC 200 includes an endpoint connector 228, an endpoint controller 210, a processor 220, a local memory 240, and processing subsystems 260 that communicate via an interconnect 250. The endpoint controller 210 includes an outbound address translation unit (ATU) 212, memory mapped registers (MMR) 214, and an inbound ATU 218. Each processing subsystem 260 may be a peripheral device, a hardware accelerator, or any other processing device that provides functionality to the host 120. As described above, each processing subsystem 260 may perform one or more functions. The functions performed by each processing subsystem 260 may be transmitted as physical functions or virtual functions to the host 120.

In some embodiments, the SoC 200 enables the host 120 to utilize each processing subsystem 260 via the PCI bus 140. The SoC 200 may be configured and reconfigured, depending on the particular implementation, to make some processing subsystems 260 available to the host 120 and others provide information to local memory 240.

In one or more embodiments, multi-function endpoint controllers are integrated in an SoC. In vehicular technology applications, for example, an automobile may have the host 120 connected to a large number of endpoints 160, including connected cameras (e.g., connected via a camera serial interface (CSI)) and connected sensors (e.g., connected via ethernet). By connecting each of the endpoints 160 to the PCI bus 140 and the host 120 via a multi-function endpoint controller integrated in an SoC, the host 120 may be upgraded while the endpoints 160 and endpoint controller remain the same. Similarly, in industrial or even personal computing implementations, an multi-function endpoint controller in an SoC may transmit, or otherwise make available, multiple functions of multiple processing subsystems (e.g., peripherals) to the host 120.

Figure 2B:
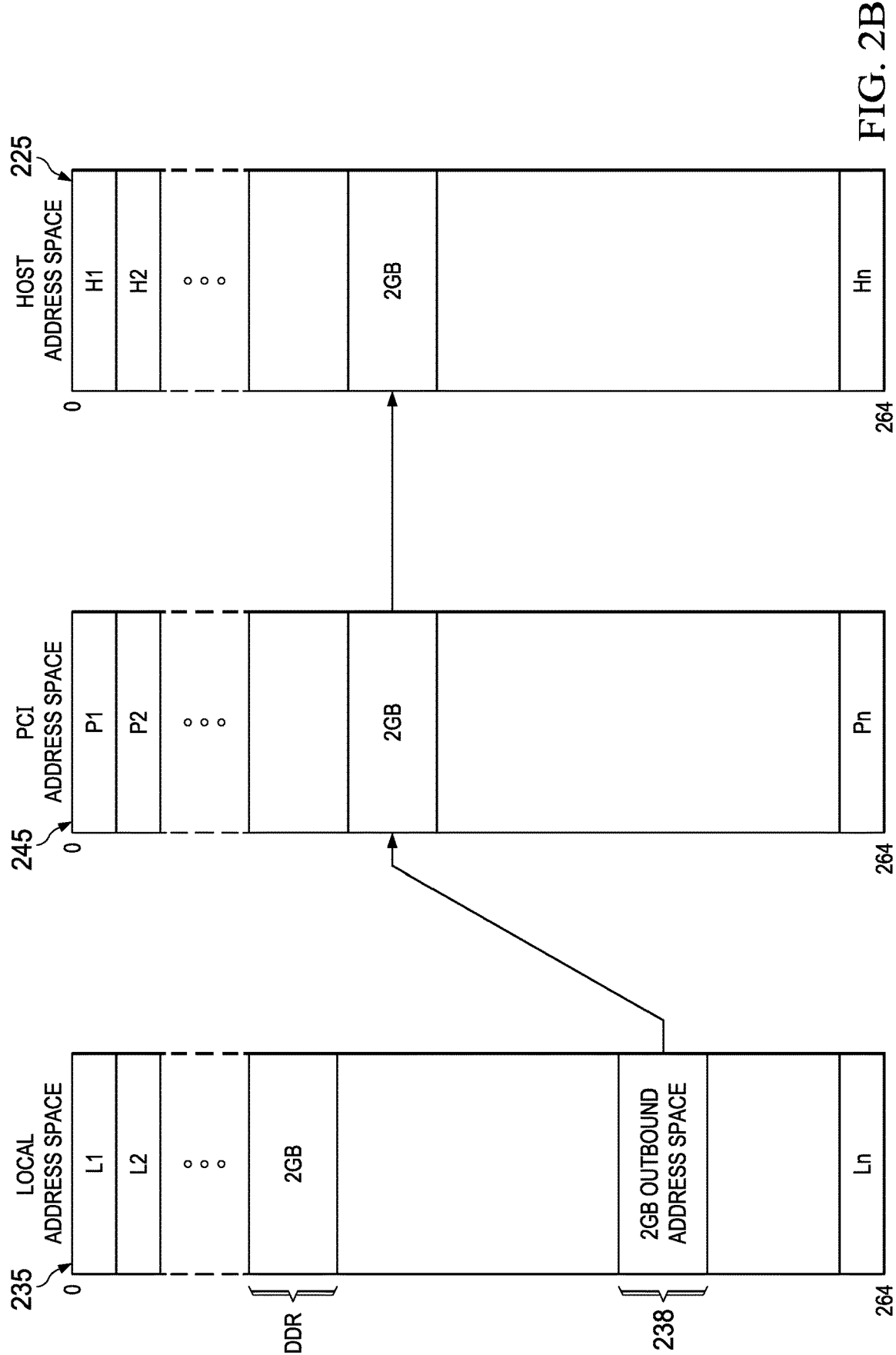

FIG. 2B is a diagram illustrating address spaces utilized by the host 120 and an SoC 200 while communicating via the PCI bus 140 in accordance with one or more embodiments.

In computing system applications, an address space defines a range of discrete addresses, each of which may correspond to a network host, peripheral device, disk sector, a memory cell or other logical or physical entity. For software programs to save and retrieve stored data, each unit of data may have an address where it can be individually located or else the program may be unable to find and manipulate the data. The number of address spaces available may depend on the underlying address structure being implemented and these may be limited by a given computer architecture being used.

SoCs may utilize their own local address space, which is independent of the address space utilized by the host 120. As shown in FIG. 2B, the address space utilized by the host 120 may be host address space 225. Further, any other SoC may utilize its own address space. For example, the address space of the SoC 200 is identified herein as local address space 235.

When requesting data from the processing subsystem 260, the host 120 may provide an address (e.g., H1, H2, and the like) in the host address space 225 for the processing subsystem 260 to provide that data. For example, the host 120 may provide an address H1 in the host address space 225 that is mapped to a location in the host memory 124 of the host 120. The host address space 225 may be mapped to the PCI address space 245, for example using an input-output memory management unit (IOMMU) or 1-to-1 mapping. In this regard, the host 120 may be programmed to provide a PCI address (e.g., P1, P2, and the like) to the processing subsystem 260. A processing subsystem 260 in an SoC 200 may provide data to an address (e.g., L1, L2, and the like) in the local address space 235. The local address space 235 of the SoC 200 may have an outbound address space 238 for outputting data to the host 120. Other local addresses (e.g., L1, L2, and the like) in the PCI address space 245 may be provided for other functions and components of the SoC 200.

Figure 2C:
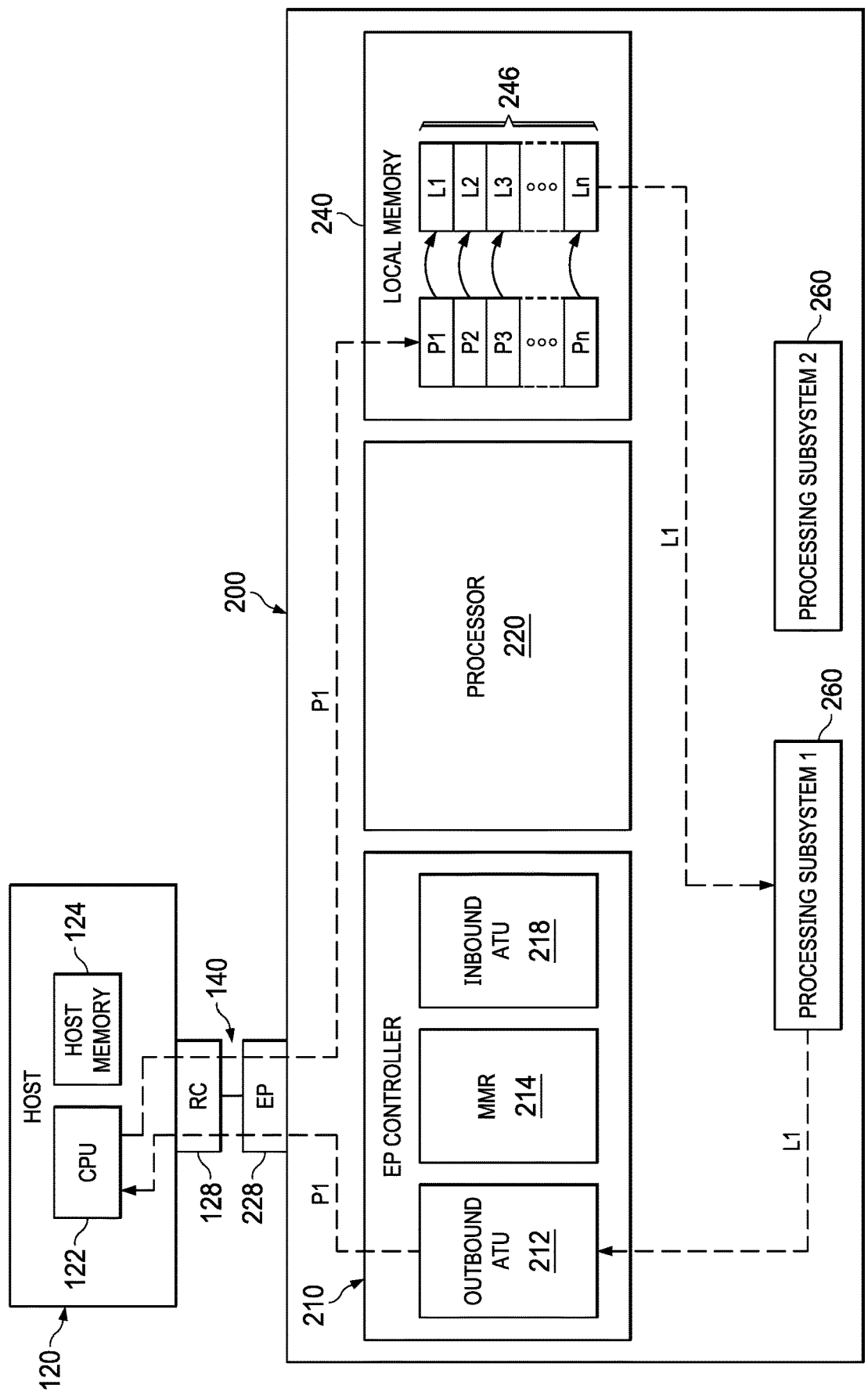

FIG. 2C is a diagram showing an SoC 200 that outputs data to an address provided by the host 120 in accordance with one or more embodiments. As shown in FIG. 2C, when requesting information from a processing subsystem 260, the host 120 may output descriptors that describe the work to be done by the processing subsystems 260. Those descriptors may form a work queue 246 for the processing subsystems 260. Those descriptors may include a buffer pointer identifying an address to provide the data. As described above, the host 120 may be configured to provide an address (e.g., P1) in the PCI address space 245.

In a non-limiting example, if a processing subsystem 260 tries to provide data to the address P1 in the local address space 235, that address P1 may not likely be the local address (e.g., L1) in the outbound address space 238 that is mapped to the PCI address P1 provided by the host 120. In fact, that address P1 in the local address space 235 may conflict with another function of the SoC 200. As a result, SoCs 200 may translate each PCI address (e.g., P1, P2, and the like) in each descriptor to a local address (e.g., L1, L2, and the like) in the outbound address space 238 of the local address space 235. That local address (e.g., L1, L2, and the like) may be then provided to the processing subsystem, which provides the data to the local address (e.g., L1, L2, and the like). Once the processing subsystem 260 outputs the information to a local address (e.g., L1, L2, and the like), the outbound ATU 212 of the endpoint controller 210 may translate the local address (e.g., L1, L2, and the like) back to the PCI address (e.g., P1, P2, and the like).

Every PCI address (e.g., P1, P2, and the like) may be translated to a local address (e.g., L1, L2, and the like), as is done by SoCs 200. In one or more embodiments, software running on the SoC 200 must be programmed to understand the format and semantics of every descriptor for every processing subsystem 260. Meanwhile, PCI addresses may be translated for every buffer or every packet each time work is enqueued. Because the PCI address (e.g., P1, P2, and the like) may point to nearly any address in the host memory 124, each PCI address (e.g., P1, P2, and the like) in each descriptor may be individually translated to a local address (e.g., L1, L2, and the like).

The host 120 may be programed to output a limited number of buffer pointers to the SoC 200 and translate all PCI addresses (e.g., P1, P2, and the like) output to the SoC 200 to local addresses (e.g., L1, L2, and the like) in the local address space 235 of the SoC 200. Such a custom implementation may eliminate the need for the SoC 200 to translate every buffer or packet in every descriptor.

In one or more embodiments, peripherals may generate interrupt requests for the processor 122 to interrupt the currently executing code such that an event may be processed in a timely manner. Processing subsystems 260 in an SoC may interrupt a core in the local system (e.g., the processor 220 of the SoC 200).

In one or more embodiments, the host 120 reserves locations in the host memory 124 for each endpoint function. For example, the host 120 may identify buffers in the host memory 124 to be used by a USB peripheral and separate buffers to be used by an ethernet peripheral. An SoC multi-function endpoint may guarantee isolation between each processing subsystem 260 such that a peripheral attached to one endpoint function does not access the memory reserved for other endpoint function.

Further, the SoC may be compatible with any host that uses only generic drivers for the processing subsystems 260. Peripheral drivers for hosts may be generally open source. For example, the extensible host controller interface (xHCI) may have an open source peripheral driver for execution by a given host. A configurable SoC multi-function endpoint controller may require modification of those drivers for extended applicability. Similarly, a configurable SoC multi-function endpoint controller that requires the host to store the address space of the endpoint or have point solutions for that endpoint may also modification for compatibility with existing hosts.

The configurable SoC multi-function endpoint controller may be compatible with processing subsystems 260. As described above, depending on the particular implementation, the SoC may be reconfigurable such that some processing subsystems 260 are available to the host 120 and others provide information to local memory 240. Meanwhile, in some implementations, the SoC may include as many as fifty or sixty peripheral devices. Those hardware peripheral devices may be supplied by vendors and the software drivers for those peripheral devices are mandated by standards. A configurable multi-function PCIe endpoint controller may be integrated in an SoC that requires custom changes to each processing subsystem 260 for that processing subsystem 260 to be available to the host 120 would limit the applicability of the configurable SoC multi-function endpoint controller. The configurable SoC multi-function endpoint controller may be configurable such that, depending on the particular implementation, processing subsystems 260 may be made available to the host 120 or made to provide information to local memory 240.

Figure 3:
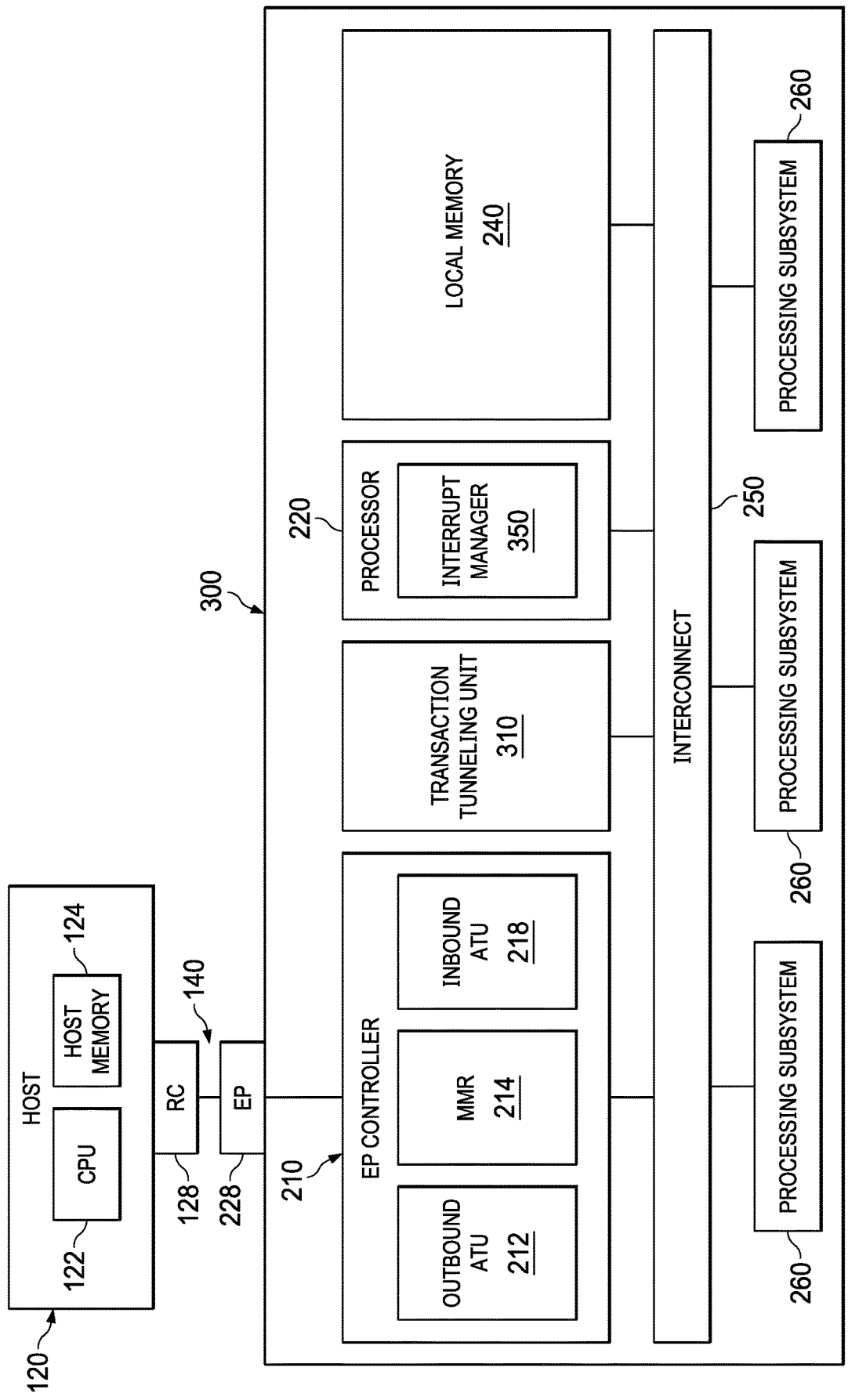
FIG. 3 is a block diagram illustrating a configurable multi-function PCIe endpoint controller in the SoC in accordance with one or more embodiments.

FIG. 3 is a block diagram illustrating a configurable multi-function endpoint controller integrated in an SoC 300 in accordance with one or more embodiments. As shown in FIG. 3, multi-function PCIe endpoint controllers may be integrated in a SoC 300. The configurable multi-function endpoint controller integrated in the SoC 300 includes the endpoint connector 228, the endpoint controller 210, the processor 220, the local memory 240, and the processing subsystems 260 (e.g., one or more peripheral devices) that communicate via the interconnect 250.

In the example of FIG. 3, the configurable multi-function PCIe endpoint controller integrated in the SoC 300 includes a centralized transaction tunneling unit 310 that eliminates the need for software intervention and translation. The configurable multi-function PCIe endpoint controller includes a multi-function interrupt manager 350 that propagates interrupt requests received from processing subsystems to the host 120.

In FIG. 3, the centralized transaction tunneling unit 310 is a hardware device integrated into the SoC 300. The multi-function interrupt manager 350 is realized as secure software (e.g., software instructions stored in local memory 240 and executed by the processor 220). As one of ordinary skill in the art may recognize, either or both of the centralized transaction tunneling unit 310 and the multi-function interrupt manager 350 may be a hardware device or software instructions executed by the processor 220.

The SoC 300 may be configured such that some processing subsystems 260 are available to the host 120 while others provide information locally. In this case, the configurable multi-function endpoint controller integrated in the SoC 300 includes a centralized transaction tunneling unit 310 that eliminates the need for software intervention to translate every PCI address (e.g., P1, P2, and the like) provided by the host 120 to a local address (e.g., L1, L2, and the like). The SoC 300 may also isolate each processing subsystem 260 such that a peripheral does not access the memory reserved for a different endpoint function 160. The SoC 300 includes a multi-function interrupt manager 350 that forwards interrupt requests to the host 120 while implicitly authenticating each interrupt request propagated to the host 120 remotely via the PCI bus 140.

In one or more embodiments, all of the functionality described above is provided by the SoC 300 without requiring any custom configuration of the processing subsystems 260 or the host 120. The SoC 300 may be compatible with any processing subsystem 260 and any host using any generic, available driver for each processing subsystem 260.

Figure 4:
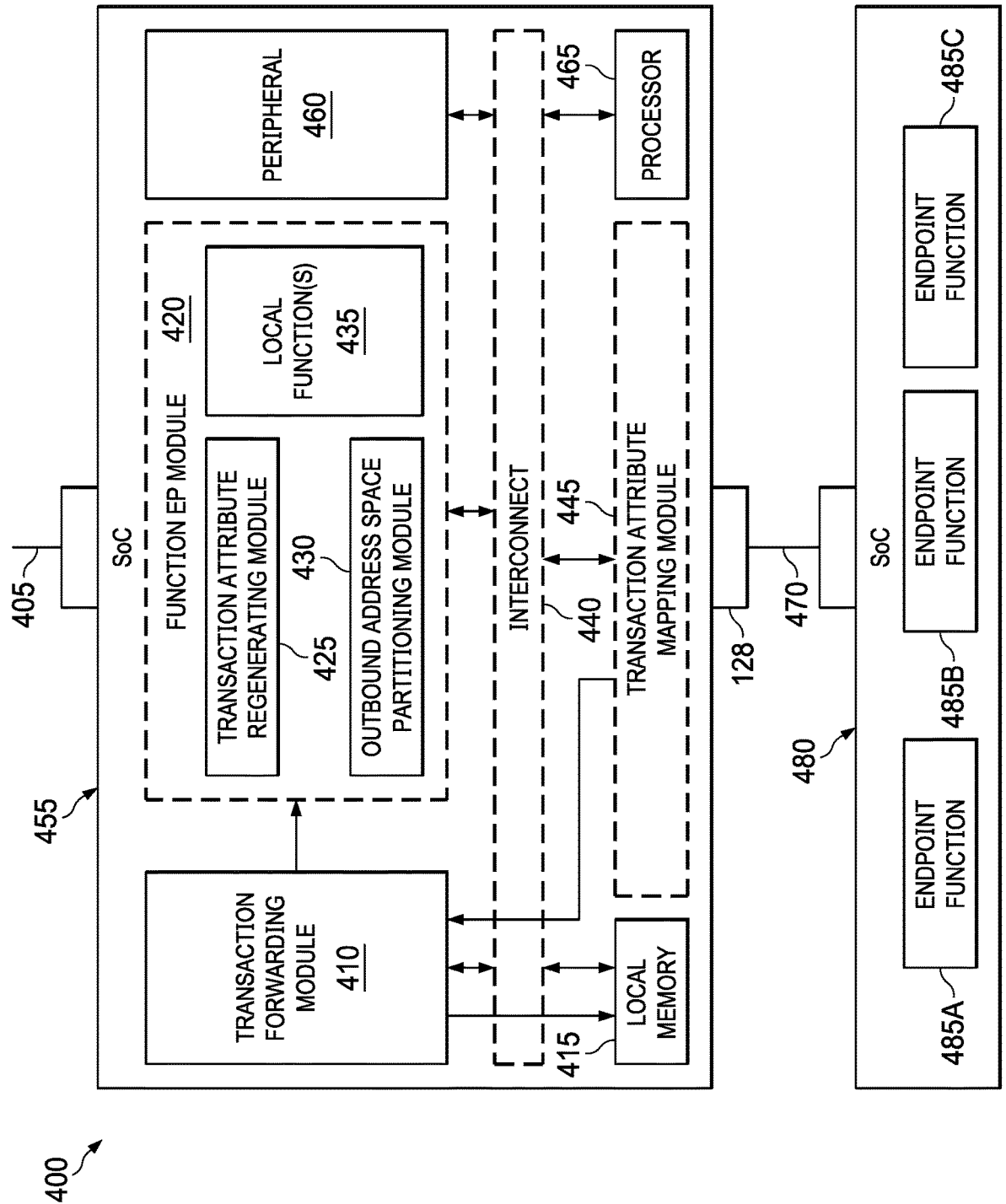
FIG. 4 is a block diagram illustrating a multi-function endpoint configuration of the SoC in accordance with one or more embodiments.

FIG. 4 is a block diagram illustrating hardware and/or software configured to establish a multi-function endpoint configuration 400 on a first SoC 455 in accordance with one or more embodiments. FIG. 4 shows a communication transaction from the second SoC 480 to the first SoC 455, such that the second SoC 480 starts a transaction that goes to a third SoC (not shown in FIG. 4) via the first SoC 455.

In the multi-function endpoint configuration 400, the first SoC 455 may bridge two or more discrete physical connections (e.g., PCI/PCIe busses) and may include an endpoint controller (e.g., processor 465) that allows for inbound transmissions 470 from a second SoC 480 via a first physical connection to be translated and passed through into outbound transmissions 405 for a second physical connection from the first SoC 455 to the third SoC. Inbound transmissions 470 to the endpoint controller may not be targeted to the local memory 415. In this case, the first SoC 455 may give its address to the third SoC for subsequent data transmission.

In some embodiments, the endpoint controller obtains endpoint information to configure outbound portals for transactions from at least one remote host (e.g., the second SoC 480). The endpoint controller may obtain forwarding information to configure routing of transactions to one or more endpoint functions. These endpoint functions may be local endpoint functions 435 in the first SoC 455 or remote source endpoint functions located in the third SoC. The endpoint controller may obtain a descriptor as the root complex 128 receives a descriptor from a host (e.g., the second SoC 480). The descriptor may include a PCI address (e.g., a parameter TransactionAddress) and PCI attributes including a requestor function identifier (e.g., a parameter RequesterID). The descriptor, the endpoint information, and the forwarding information may be used by the endpoint controller to initialize access between the host and various functions and to establish a communication path between the host and a function out of the various functions. In FIG. 4, the function may be a memory access function located in the first SoC 455 or a forwarding function to ultimately access a function in the third SoC.

In one or more embodiments, the first SoC 455 includes the root complex 128 to establish a communication path with a second main function endpoint (e.g., the second SoC 480). The second main function endpoint in the second SoC 480 may include multiple source endpoint functions 485A-485C. The root complex 128 may be a root of a PCIe tree system that detects and configures connected devices. In some embodiments, the root complex 128 allows for a PCIe bridge to be implemented by interconnecting any upstream ports to downstream ports. Each component in the PCIe tree system may be uniquely identified by the RequestorID denoted in a vector programmed in the sequence "Bus:Device:Function" (e.g., also referred to as bdf).

In one or more embodiments, the first SoC 455 includes a transaction forwarding module 410, a multi-function endpoint module 420, at least one peripheral 460, a processor 465, and a local memory 415 interconnected through an interconnect 440. In one or more embodiments, the multi-function endpoint module 420 includes a transaction attribute regenerating module 425 coupled to an outbound address space partitioning module 430. In some embodiments, to allow the second SoC 480 to access a function in a third main function endpoint in the third SoC, the multi-function endpoint module 420 sends a transaction to access the third SoC connected with the first SoC 455 in a daisy chain. The transaction includes the PCI address (e.g., SoCAddress) and the requestor function identifier (e.g., RequesterID) in the format "{RequesterID, SoCAddress}". In some embodiments, the PCI address and the requestor function identifier in the transaction cause the first SoC 455 to forward endpoint information and forwarding information to reach a function in the second SoC 480. The transaction attribute regenerating module 425 may be hardware and/or software configured to inverse map outbound addresses to the transaction Address/PCI address and to regenerate the RequestorID based on a transaction forwarding recurrence relation. The outbound address space partitioning module 430 may be hardware and/or software configured to partition the outbound address space based on a number of SoCs in the daisy chain.

The processor 465 may be hardware and/or software configured to establish the communication path between the host and the local memory 415 when the function is the memory access function. The processor 465 may be hardware and/or software configured to establish the communication path between the host and the third SoC when the function is the forwarding function. The local memory 415 may be a storage unit configured to be accessed through the transaction forwarding module 410 of the first SoC 455. The interconnect 440 may be hardware and/or software configured to route, based on the PCI address and the requestor function identifier and through the forwarding function, communications from the host to a specific SoC out of the one or more additional SoCs.

The interconnect 440 may be configured to provide the PCI address from the root complex to the centralized transaction tunneling unit. The transaction forwarding module 410 includes the centralized transaction tunneling unit 310 to receive data from the root complex and to translate the PCI address to a local address. The outbound address translation unit (ATU) may be configured by the outbound address space partitioning module 430 to translate the local address to the PCI address received from the host.

In some embodiments, the first SoC 455 is configured to provide various functions to the host. The first SoC 455 includes the outbound address space corresponding to PCI addresses provided by the host. The SoC may be configured to partition the outbound address space such that each function out of the various functions provided by the controller is assigned a partition in the outbound address space. Each function out of the various functions may be performed by one of multiple processing subsystems and may be configured to output a unique credential. The centralized transaction tunneling unit 310 may store a translation table mapping each unique credential to the partition in the outbound address space.

In one or more embodiments, the first SoC 455 includes an inbound address space including at least one entry mapped to a control register. The inbound address space includes an entry for each of the various functions for the host to populate the PCI address.

The first SoC 455 may include a transaction attribute mapping module 445 associated with the root complex 128. The transaction attribute mapping module 445 may be hardware and/or software configured to select local attributes based on incoming transactions RequestorID and/or a Process Address Space ID (PASID).

The at least one peripheral 460 may be a subsystem such as the processing subsystem 260, a peripheral device, a hardware accelerator, or any other processing device that provides functionality to the host 120 in the manner described in reference to FIGS. 1-3.

Figure 5:
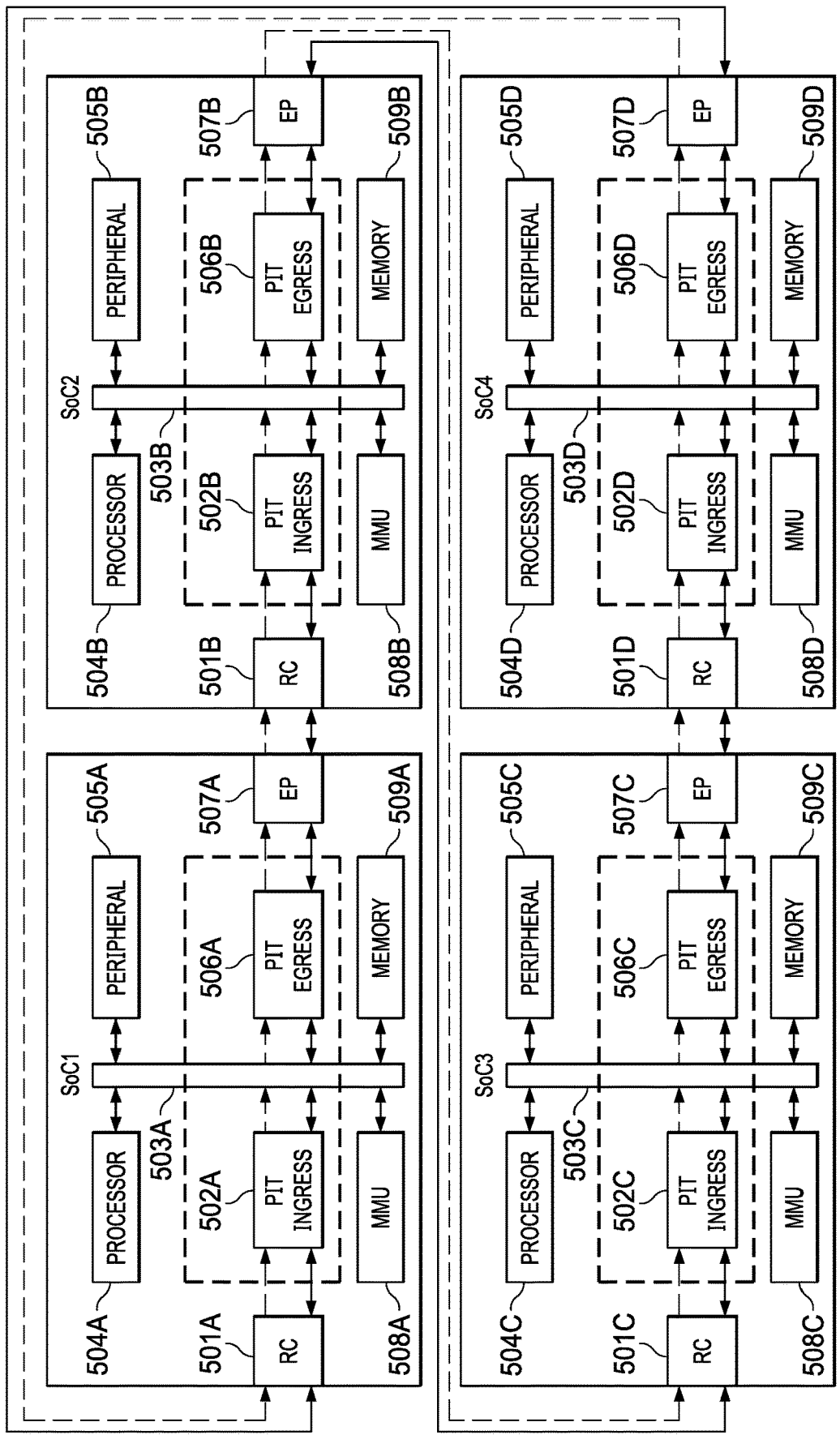
FIG. 5 is a block diagram illustrating a multi-chip daisy chain topology using PCIe in accordance with one or more embodiments.

FIG. 5 is a block diagram illustrating a multi-chip daisy chain system 500 using PCIe in accordance with one or more embodiments. In FIG. 5, the multi-chip daisy chain system 500 includes four SoCs (e.g., SoC1, SoC2, SoC3, and SoC4) connected in series such that one SoC shares only one connection with another SoC. Each SoC includes a root complex (e.g., root complexes 501A, 501B, 501C, and 501D), at least one processor (e.g., processors 504A, 504B, 504C, and 504D), at least one peripheral performing a function (e.g., peripherals 505A, 505B, 505C, and 505D), a management memory unit (e.g., management memory units (MMU) 508A, 508B, 508C, and 508D), a local memory (e.g., local memories 509A, 509B, 509C, and 509D), and an endpoint controller (e.g., endpoint controllers 507A, 507B, 507C, and 507D) coupled and/or operably connected via a dedicated interconnector (e.g., interconnectors 503A, 503B, 503C, and 503D). Each dedicated interconnector includes a PCIe Intelligent Tunneling (PIT) ingress (e.g., PIT ingresses 502A, 502B, 502C, and 502D) that monitors and controls inbound transmissions between the root complex and the dedicated interconnect and a PIT egress (e.g., PIT egresses 506A, 506B, 506C, and 506D) that monitors and controls outbound transmissions between the dedicated interconnect and the endpoint controller.

In one or more embodiments, the four SoCs are configured as remote SoCs with independent functions with unique addresses and identifiers associated with them. In these SoCs, communication paths may be established once access is being granted to individual functions. The communication paths may be configured for the daisy chain topology automatically by one of the SoCs in the chain. The communication paths may be established to follow a translation and forwarding scheme based on a requesting function identifier (RequestorID). In some embodiments, the four SoCs are configured to follow a data path in a single direction (e.g., direction of the dotted arrow) such that the daisy chain may move from one SoC to another until the function matching the correct PCI address reaches the correct requesting function identifier. Each SoC includes a multi-function endpoint in the manner described in reference to FIGS. 1-4. Each function in the multi-function endpoint may provide a view of the other SoCs in the daisy chain and may be used by one SoC to transfer data to other SoCs. In this regard, the four SoCs may be configured to implement a dynamic system discovery management configuration that allows for daisy chain of multiple SoCs by connecting a multi-function endpoint of one SoC to a root complex of another SoC. The dynamic system discovery management configuration may allow for intelligent discovery of a system in one SoC irrespective of the order of SoCs in the chain (or the sequence of power up). The SoCs may implement the transaction attribute mapping configuration while maintaining a persistent end-to-end Quality of Signal (QoS) and isolation, as described in FIG. 4.

In some embodiments, one SoC automatically identifies a connection to the one or more SoCs as a daisy chain topology. The SoC may perform an auto identification of a PCIe tree topology for daisy chain using hardware and/or software configured to intelligently detect and configure daisy chain topology connections. In this regard, the SoC may define a sequence to discover and configure nodes along the daisy chain. The SoC may configure a transaction sink unit and a transaction source unit to set up address transactions to each node. The SoC that automatically identifies the daisy chain topology may perform innovative mapping via the recurrence relation of daisy-chaining while using the multi-function endpoints.

Figure 6:
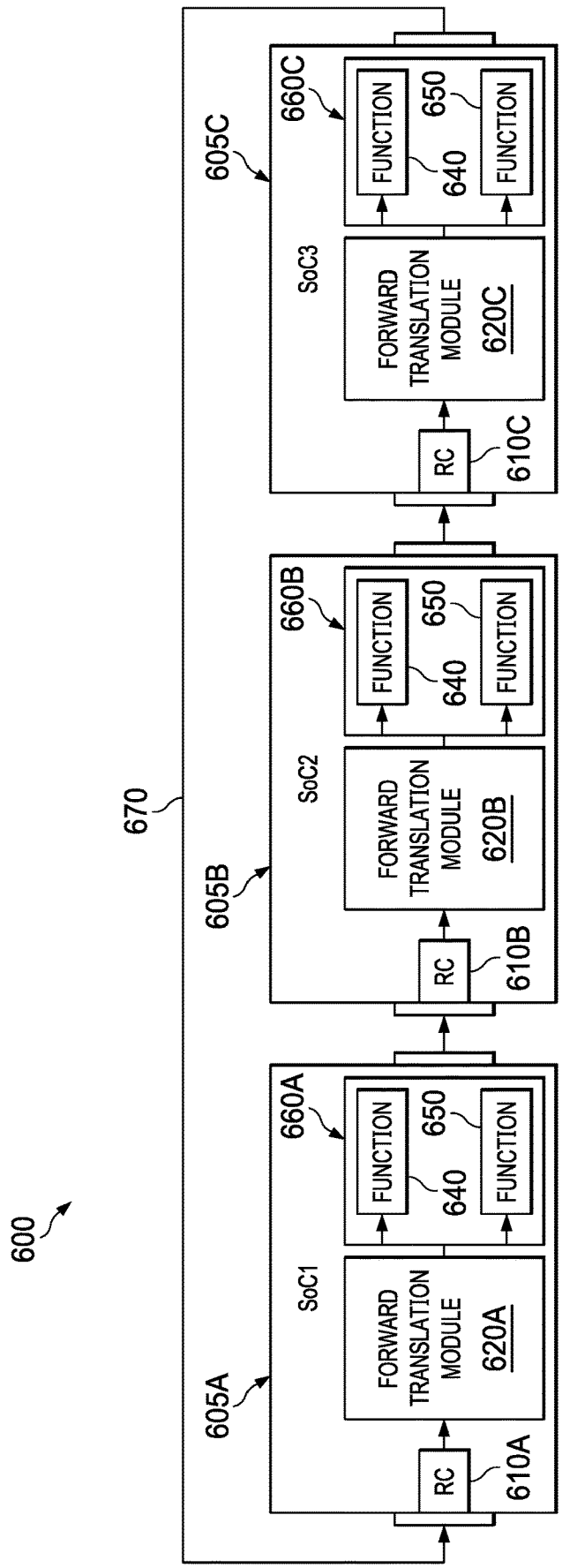
FIG. 6 is a block diagram illustrating the multi-chip daisy chain topology using PCIe in various SoCs configured with the multi-function endpoint configuration in accordance with one or more embodiments.

FIG. 6 is a block diagram illustrating the multi-chip daisy chain topology using PCIe in various SoCs configured with the multi-function endpoint configuration in accordance with one or more embodiments. These SoCs (e.g., SoC1, SoC2, and SoC3) are in a daisy chain configuration 600. The daisy chain configuration 600 includes the SoCs connected in series. The SoCs follow a data path direction that enters the SoCs at their root complex (RC) (e.g., RCs 610A, 610B, and 610C) and exits to an endpoint function (e.g., endpoint functions 640, 650, and 660) through their endpoint controller (e.g., endpoint controllers 660A, 660B, and 660C). The root complexes may be configured to translate communications between a host and a function located in any of the SoCs as described in reference to FIG. 5.

In one or more embodiments, each SoC is uniquely modeled with a multi-function endpoint. Further, each SoC may be mapped with local addresses to facilitate search an monitoring of an independent function for forwarding to a targeted SoC. Each function has its own set of bar register (e.g., BAR addresses for address matching) and an Address Translation Unit (ATU). An intended destination for any given transaction may be encoded using the "RequesterID" (e.g., function Identifier field)–the RequesterID may be regenerated at each hop along the daisy chain. The daisy chain configuration 600 includes address translation and forwarding logic to forward transactions between the root complexes and the multi-function endpoint controllers. For example, as the addresses are translated, SoC1 may identify a communication path to be established between a host and another SoC (e.g., SoC2 or SoC3). If the address is received at SoC1 and the function selected is located in SoC2, a forward translation module (e.g., modules 620A, 620B, and 620C) instructs for the communication path to be established between the host and a first function 640. This path causes the connection to move on to the SoC2. Further, if the address is received at SoC1 and the function selected is located in SoC3, the forward translation module 620A instructs for the communication path to be established between the host and a second function 650. This path causes the connection to move on to the SoC2 and then to the SoC3, following the data path direction.

Figure 7:
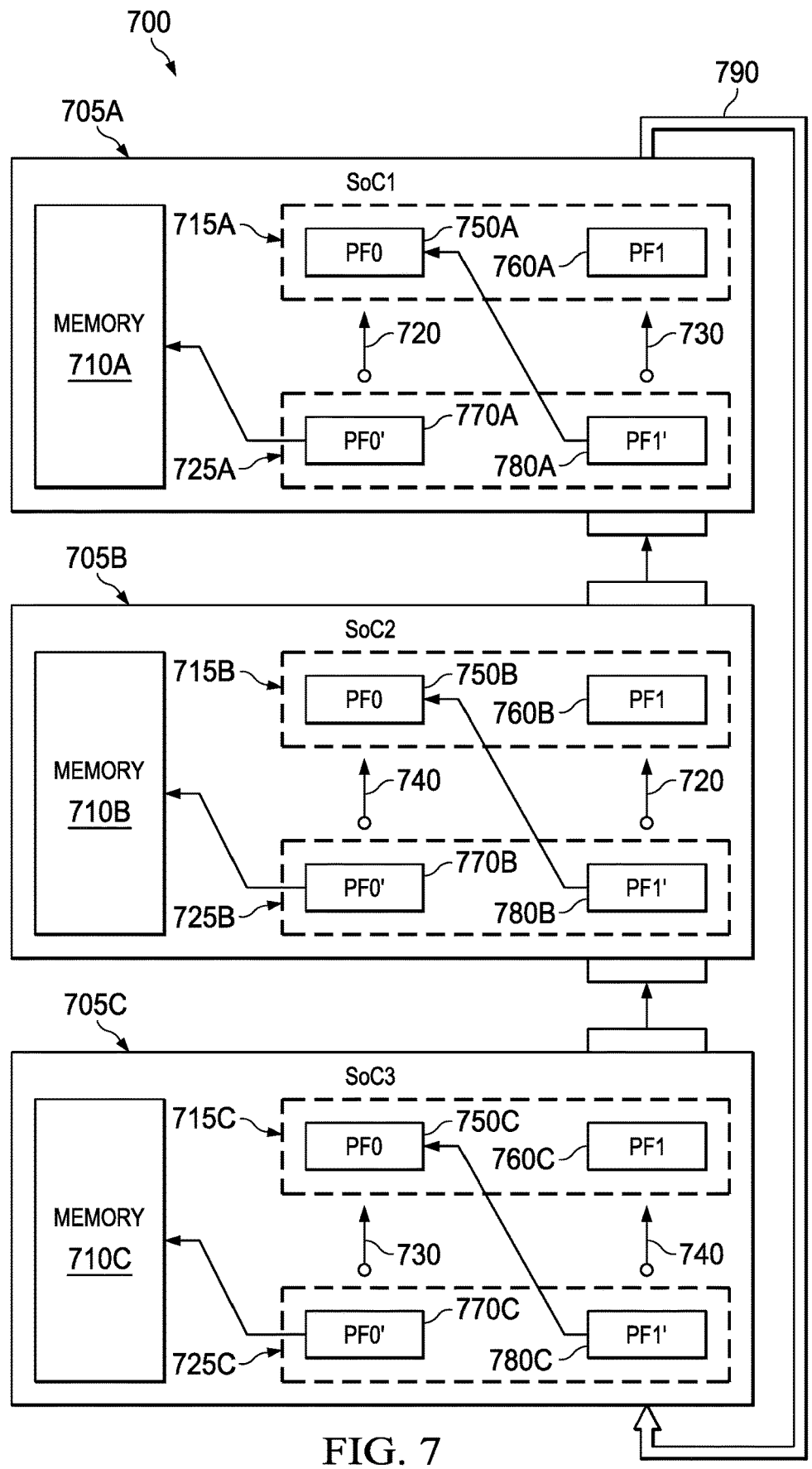
FIG. 7 is a block diagram illustrating a transaction forwarding configuration of the multi-chip daisy chain topology in accordance with one or more embodiments.

FIG. 7 is a block diagram illustrating a transaction forwarding configuration 700 of the multi-chip daisy chain topology in accordance with one or more embodiments. In FIG. 7, three SoCs (e.g., SoC1 705A, SoC2 705B, and SoC3 705C) are connected in a daisy chain. Each SoC includes a local memory (e.g., memories 710A, 710B, and 710C), multiple endpoint functions (e.g., PF0 or PF1), and multiple root complex enumerated functions (e.g., PF0' or PF1').

The multiple endpoint functions are endpoint functions (e.g., endpoint functions 715A, 715B, and 715C) located in a specific SoC. For example, endpoint functions for SoC1 705A, SoC2 705B, and SoC3 705C may include endpoint functions PF0 750A and PF1 760A, endpoint functions PF0 750B and PF1 760B, and endpoint functions PF0 750C and PF1 760C, respectively. The multiple root complex enumerated functions (e.g., root complex functions 725A, 725B, and 725C) are root complex functions for directing daisy-chained requests. For example, root complex functions for SoC1 705A, SoC2 705B, and SoC3 705C may include root complex functions PF0' 770A and PF1' 780A, root complex functions PF0' 770B and PF1' 7806, and root complex functions PF0' 770C and PF1' 780C, respectively. The root complex functions may be configured to access individual functions in their respective SoCs. In some embodiments, a first root complex function may be configured to access the local memory while a second root complex function may be configured to access one of the endpoint functions. Each endpoint function may be designated for forwarding a communication request to one of the other two SoCs. For example, a request received by SoC2 705B may indicate that a data path 790 received by the SoC3 705C is meant to reach the SoC1 705A. As a result, the SoC2 705B may use address 720 into PF1 760B, which connects with one of the root complex functions in SoC1 705A. In some embodiments, each SoC may include address information (e.g., address control to reach SoC1 720, address control to reach SoC2 730, and address control to reach SoC3 740) for the other two SoCs.

In these SoCs, a transaction directed to a PF0', identified by RequestorID, may be terminated locally, and mapped to an intended local memory target (e.g., memories 710A, 710B, and 710C). Transactions from other PFs (e.g., a PF1') may be forwarded through (e.g., tunneled) using the management address mapping configuration from RC to EP PCIe address space. For forwarded transactions, an outgoing transaction from an EP may use value of "Function Number −1", based on an input RequestorID of an incoming packet.

As described above, the EP initializing includes setting up an outbound portal for transactions to a remote host (e.g., EP interface), partitioning each remote SoC in the daisy chain, and mapping each individual partition to give unique function level mapping. In some embodiments, the initialization includes an inverse mapping to get the PCIe address and setting up interconnect attributes to a PCIe attribute mapping.

As described in FIG. 4, the RC initializing includes setting up configurations to forward transactions to an endpoint controller, setting up attributes to an interconnect attribute mapping for forwarding, and setting up mapping so that outbound transactions are targeted towards a correct outbound portal set up by an EP.

In one or more embodiments, transaction forwarding may be controlled by a recurrence relation following a vector programmed in the sequence "Bus:Device:Function" through different mapping controls 720, 730, and 740 corresponding to forwarding in a corresponding SoC along the daisy chain. For example, a transaction from a source SoCn to a target SoCn+x, where x>0, may be accessed at the local memory in SoCn using the bdf "SoCn:EP:PF(x−1)", where EP corresponds to a specific endpoint and PF may be PF0 or PF1 for transaction forwarding configuration 700. Further, if any transaction to "SoCn:RC:PF0'" is for an SoCn memory, any forward transaction mapped to "SoCn:RC:PFx'", where x>0, may be routed to "SoCn:EP:PF(x−1)".

Figure 8:
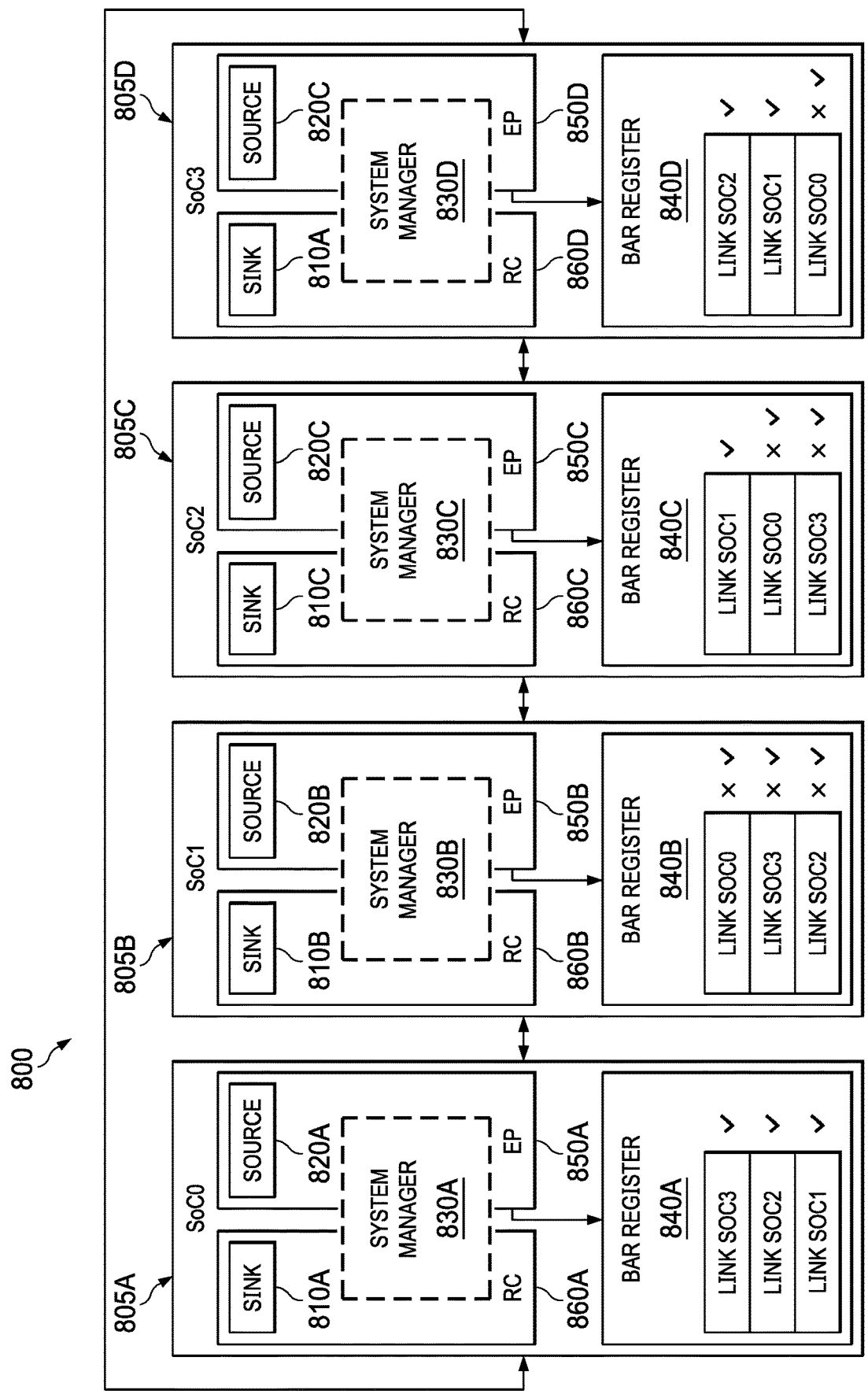
FIG. 8 is a block diagram illustrating a dynamic topology discovery configuration of the multi-chip daisy chain topology in accordance with one or more embodiments.

FIG. 8 is a block diagram illustrating a dynamic system discovery configuration 800 of the multi-chip daisy chain topology in accordance with one or more embodiments. In FIG. 8, each SoC (e.g., SoC0 805A, SoC1 805B, SoC2 805C, and SoC3 805D) connected in the daisy chain topology includes a bar register (e.g., bar registers 840A, 840B, 840C, and 840D) in which links to each of the other SoCs are checked against a function mapped to the requested address. The bar registers are memory locations that are dynamically populated with addresses to reach other SoCs in the daisy chain (e.g., links to each SoC). Each SoC includes a system manager (e.g., system managers 830A, 830B, 830C, and 830D) that evaluates the bar registers as the communications are exchanged between the RC (e.g., root complexes 860A, 860B, 860C, and 860D) and the EP (e.g., endpoints 850A, 850B, 850C, and 850D) along the daisy chain. The bar registers may be enumerated and mapped by a transaction sink unit (e.g., transaction sink units 810A, 8106, 810c, and 810D). Addresses for these bar registers may be programmed by a transaction source unit (e.g., transaction source units 820A, 820B, 820c, and 820D). The bar registers (in the multi-function EP controller) may be mapped to the local memory using the respective transaction source unit. The next SoC with the respective RC enumerates the EP using the transaction sink units to access the respective bar memory of the enumerated EP.

In some embodiments, the system manager of each SoC runs on every node in the daisy chain and gives an unified view of overall system to monitor a status reported by any immediate SoC neighbors. Each SoC may share any state changes to maintain a coordinated mapping and monitoring of functions between SoCs to dynamically enable/disable functions based on any discovered topologies. In FIG. 8, this is shown as an example in checks and crosses next to each link for each SoC (e.g., link SoC1, link SoC2, link SoC3, and link SoC4).

Figure 9A:
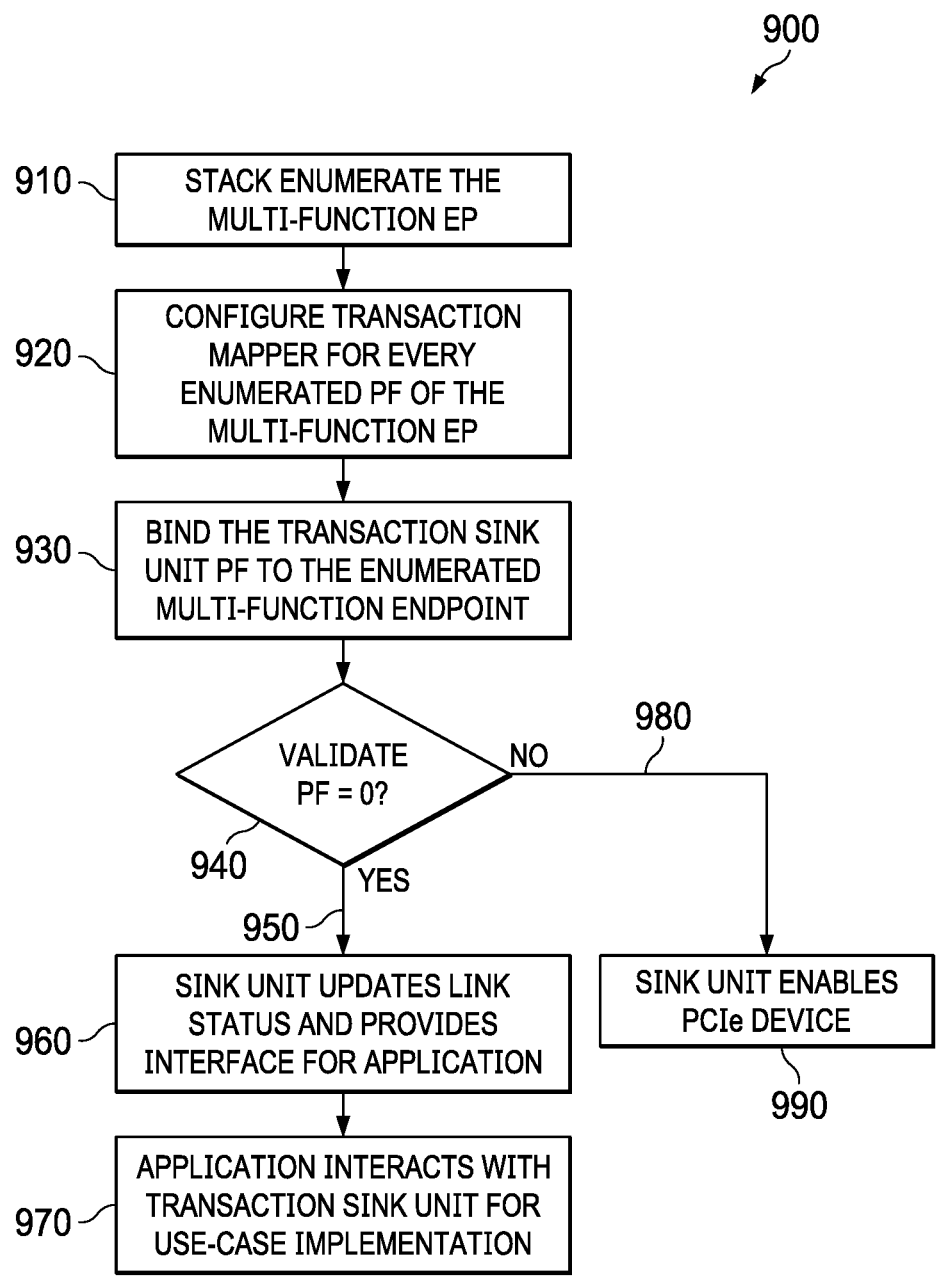
FIGS. 9A and 9B are flowcharts illustrating two initialization sequences of the multi-chip daisy chain topology in accordance with one or more embodiments.
Figure 9B:
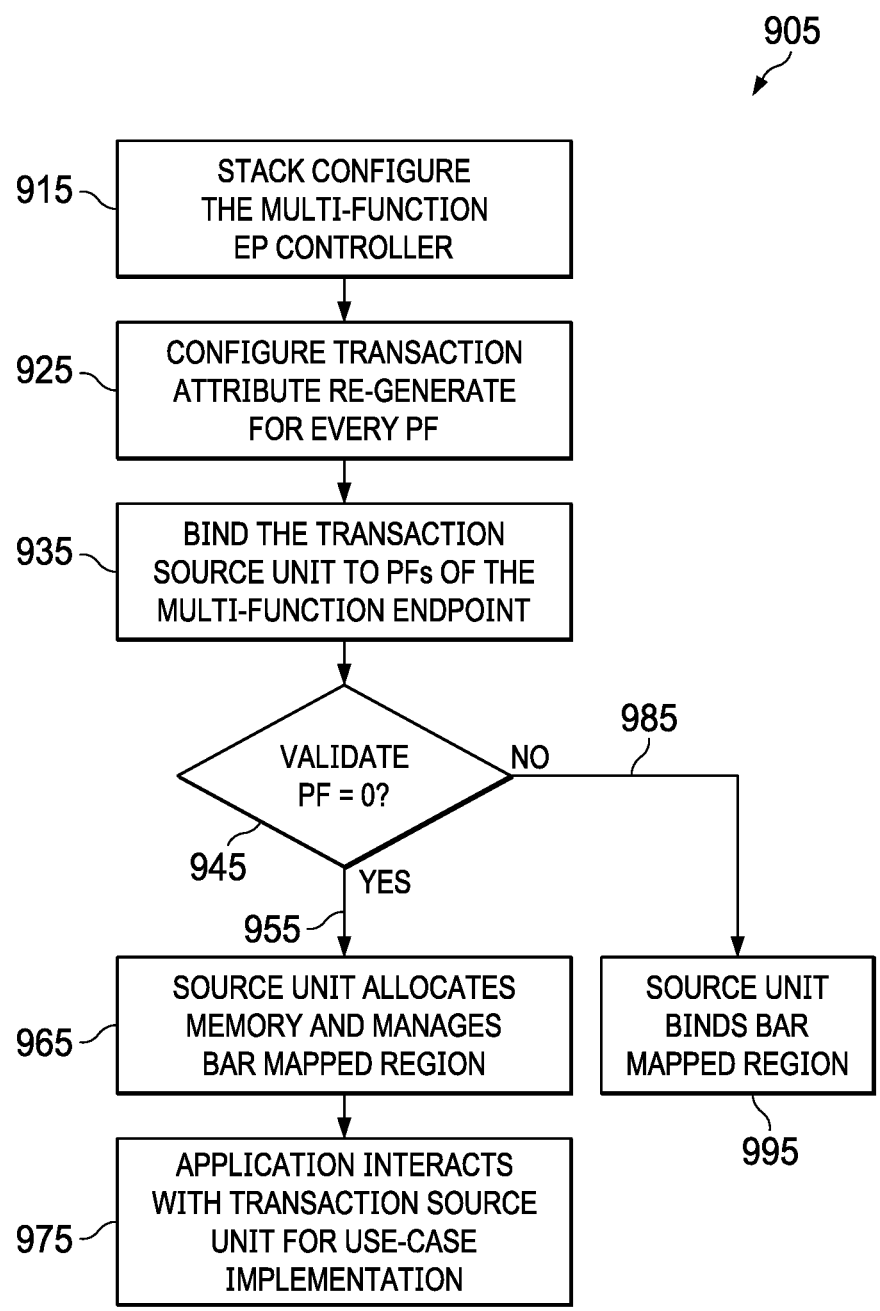

FIGS. 9A and 9B are flowcharts illustrating two initialization sequences of the multi-chip daisy chain topology in accordance with one or more embodiments. To enable daisy chain hopping, each SoC in the daisy chain may perform a root complex (RC) initiation 900 and an endpoint (EP) initiation 905.

To perform the RC initiation 900, at 910, the RC for a given SoC may enumerate all physical functions (PFs) in the SoC and may configure a transaction mapper for every enumerated function in the SoC. At 920, once each function is enumerated, these functions may be mapped to a local register and be made available as functions in the SoC. At 920, a transaction mapper is configured for each enumerated PF of the multi-function EP, which includes a transaction forwarding configuration.

At 930, a transaction sink unit binds PFs of the enumerated multi-function EP. The PFs are associated with the multi-function EP in the bar register of the specific SoC.

At 940, the SoC determines whether an enumerated function is a PF located in the SoC. For example, the SoC may validate that the bar register includes an address for an SoC that is next along the daisy chain. This validation may take the form of sampling the information in the first bar registry to determine that the linking address at this location is for the subsequent SoC in the daisy chain.

Following line 950 to 960, the transaction sink unit provides an address to the remote SoCs for accessing local SoC and also maintaining the local topology table. At 970, an application or endpoint function is set to interact with the transaction sink unit for a use-case implementation in the SoC, as requested. In this case, the SoC is enabled to forward access to endpoint functions or local memory in the SoC to access local resources from the local memory. Following line 980 to 990, the transaction sink unit only enables the enumerated function in a position to forward transactions. The current address value may be a predetermined register value in a preserved link status (e.g., LINKSTATUS) register of the SoC, which sets the SoC to move communications to endpoints that will forward access requests to other SoCs.

To perform the EP initiation 905, at 915, the EP controller for a given SoC may be configured (e.g., programmed) with all functions in the SoC and their respective attributes (e.g., resources). Once each function is configured, these functions may be accessed in sequence. At 925, transaction attributes (e.g., a requestor function identifier, such as a parameter RequesterID) are configured to re-generate for every PF. Here, each PF pre-sets and address access within the SoC to allow each endpoint function to be accessed individually. At 935, the multi-function EP controller establishes a link with the RC of the next SoC in the daisy chain. Here, the multi-function EP controller may ready the SoC for a possibility of establishing a communication path with any of these functions.

At 945, the SoC determines whether a configured function is a function located in the SoC. The SoC validates the request and the attributes to determine whether the PF is associated with an endpoint in the SoC. Following line 955 to 965, the SoC provides a way for the transaction sink unit to communicate the address (manage BAR mapped region) for allowing a remote SoC to access a specific function (for SoCs that are directly connected to each other) in the SoC performing the function. At 975, an application or root complex function is set to interact with the transaction source unit for a use-case implementation in the SoC, as requested by the SoCs. In this case, the SoC is enabled to allow access for external SoCs that may request access to endpoint functions or the local memory in the SoC. Following line 985 to 995, a transaction source unit (of one SoC) is configured to avoid communicating the addresses to other SoCs.

Figure 10:
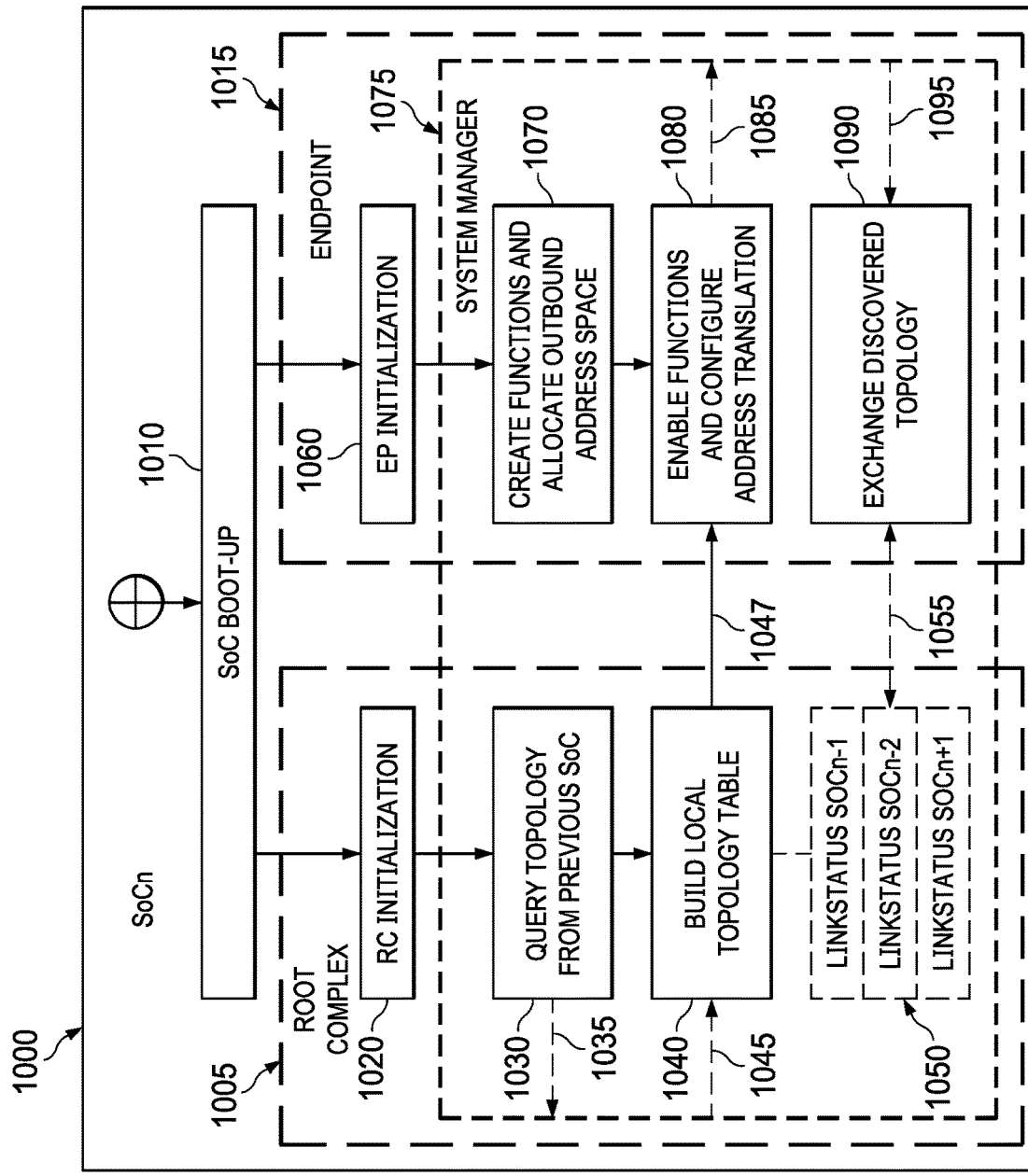
FIG. 10 is a flowchart illustrating a method for implementing a dynamic topology management configuration of the multi-chip daisy chain topology in accordance with one or more embodiments.

FIG. 10 is a flowchart illustrating a method for implementing a dynamic system management configuration 1000 of the multi-chip daisy chain topology in accordance with one or more embodiments. The dynamic system management configuration 1000 allows for SOCs in the daisy chain to power up in any order, to be connected in any order, and to implement a standardize mapping of functions between SoCs. The dynamic system management configuration 1000 may be started at block 1010 by booting up any of the SoCs (e.g., at SoCn) and by simultaneously performing an RC initialization and an EP initialization.

At 1020, the RC initialization may be performed by the root complex 1005 implementing a query system at 1030 that enumerates functions in the SoCn-1 based on a previous communication 1035 received on the SoCn-1. Further, at 1040, the RC initialization may build a local system table so that link statuses may be checked for each function mapped at 1050.

At 1060, the EP initialization may be performed by the endpoint 1015 creating functions and allocating outbound address spaces at 1070. Further, at 1080, the EP initialization may enable one or more functions from the functions created along with their corresponding addresses.

At 1090, a system manager 1075 shares a discovered system in the SoCn based on the paths available for communication. At this point, the statuses of any paths and addresses associated with the SoCn are effectively determined and updated. The system manager 1075 may send outbound transmissions 1085 sharing the link statuses available in the SoCn to the next SoC. The system manager 1075 may send outbound transmissions 1085 sharing the functions available in the SoCn to the next SoC. The system manager 1075 may receive inbound transmissions 1095 sharing the functions available in the next SoC to the SoCn.

Figure 11:
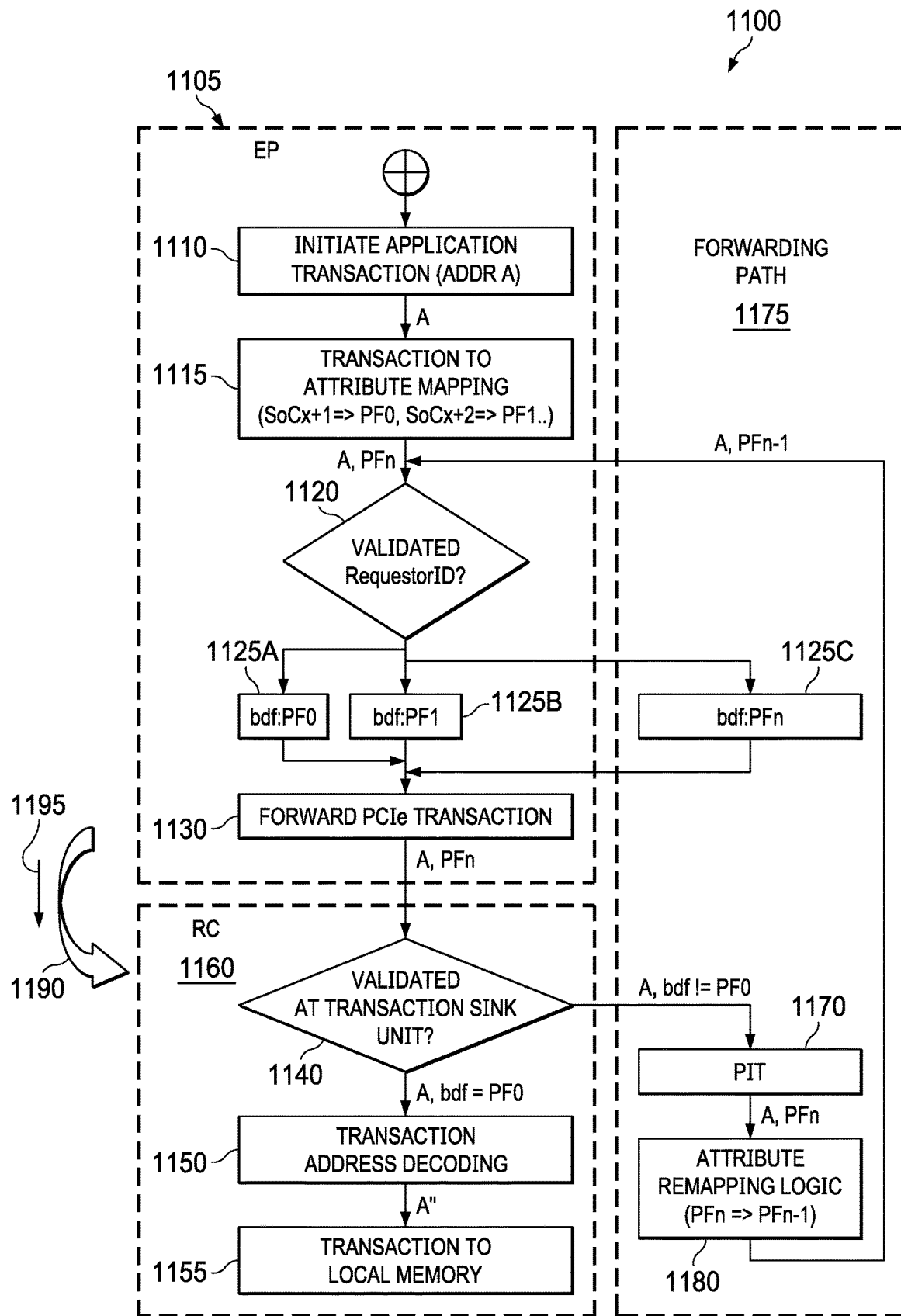
FIG. 11 is a flowchart illustrating a method for implementing a dynamic transaction forwarding configuration in accordance with one or more embodiments.

FIG. 11 is a flowchart illustrating a method for implementing a dynamic transaction forwarding configuration 1100 from a first SoC to a second SoC in accordance with one or more embodiments.

At 1110, an endpoint 1105 (e.g., multi-function endpoint) of the first SoC initiates a transaction for a predefined address. The endpoint 1105 obtains endpoint information to configure at least one outbound portal for transactions to at least one remote host (e.g., other SoCs).

At 1115, the endpoint 1105 performs attribute mapping for all functions identified and configured for the first SoC. The attribute mapping includes mapping the attributes (e.g., a requestor function identifier, such as a parameter RequesterID) from a communication to the endpoints. As described in reference to FIGS. 1-6, the attributes include addresses and requests from the first SoC to one of the endpoint functions in the first SoC. The endpoint 1105 obtains forwarding information to configure routing of transactions (e.g., other functions) to one or more endpoint functions.

At 1120, the endpoint 1105 is configured to receive and evaluate an attribute descriptor from the host (e.g., the second SoC through the forwarding path) or from an EP in the first SoC (e.g., through the source path). The descriptor includes a PCI address and a requestor function identifier. The combination of the PCI address and the requestor function identifier are compared to various functions available (e.g., 1125A, 1125B, or 1125C).

At 1130, once the combination of the PCI address and the requestor function identifier are compared, the PCIe transaction is forwarded.

At 1140, after crossing systems in a forward direction 1195 while performing a hop 1190 in the daisy chain, a transaction sink unit in a root complex 1160 (e.g., PCIe root complex) of the second SoC determines whether transaction is targeted at local memory. Alternatively, the transaction sink unit in the root complex 1160 of the second SoC determines whether the transaction has to be forwarded to a third SoC (not shown).

At 1150, the transaction sink unit in the root complex 1160 of the second SoC determines that the transaction is targeted to local memory. This is done through transaction address decoding of the PCI address and the requestor function identifier.

At 1155, the second SoC forwards the transaction between the host and the local memory.

At 1170, the transaction sink unit in the root complex 1160 of the second SoC determines that the transaction has to be forwarded to the third SoC. This is done through a tunneling of the address through a forwarding path 1175 and without performing any transaction address decoding of the PCI address and the requestor function identifier.

At 1180, an attribute mapping is performed for the forwarding path to allow another hop in the daisy chain to the third SoC.

In the description, certain specific details are set forth in order to provide a thorough understanding of various disclosed implementations and embodiments. However, one skilled in the relevant art will recognize that implementations and embodiments may be practiced without one or more of these specific details, or with other methods, components, or materials.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. A system-on-chip (SoC) comprising:
    a processor;
    a local memory;
    a root complex operably connected to the processor and the local memory and configured to:
        obtain forwarding information to configure routing of transactions to one or more peripheral component interface express (PCIe) endpoint functions or to the local memory, and
        initialize, based on the forwarding information, access between a host and the one or more PCIe endpoint functions; and
    a multi-function endpoint controller configured to:
        obtain a descriptor and endpoint information to configure outbound portals for transactions to at least one remote host, and
        establish a communication path between the host and a function out of a plurality of functions.

2. The SoC of claim 1, wherein the descriptor comprises a PCI address and a plurality of PCI attributes indicating whether a transaction is directed to the one or more PCIe endpoint functions or the local memory.

3. The SoC of claim 2, further comprising:
    a centralized transaction tunneling unit configured to translate the PCI address to a local address that directs a forwarding direction of the transaction in the SoC; and
    an interconnect configured to provide the PCI address from the root complex to the centralized transaction tunneling unit.

4. The SoC of claim 3, further comprising:
    an outbound address translation unit (ATU) configured to translate the local address to the PCI address received from the host when the descriptor associates the transaction to another SoC; and
    a transaction attribute mapping module configured to map at least one of the plurality of PCI attributes to a local attribute.

5. The SoC of claim 3, wherein the centralized transaction tunneling unit is further configured to:
    identify, via the centralized transaction tunneling unit, the local attribute in the PCI address, and
    forward, based on the local attribute and the local address, the transaction to the local memory.

6. The SoC of claim 3, wherein the centralized transaction tunneling unit is further configured to:
    identify, via the centralized transaction tunneling unit, a local attribute in the PCI address, and
    forward, based on the local attribute and the local address, the transaction to the multi-function endpoint controller.

7. The SoC of claim 1, wherein:
    the SoC is configured to provide the plurality of functions to the host,
    the SoC includes an outbound address space corresponding to PCI addresses provided by the host, and
    the SoC is configured to partition the outbound address space such that each function out of the plurality of functions provided by the controller is assigned a partition in the outbound address space.

8. The SoC of claim 1, wherein the SoC is further configured to set up an inbound address space for entry of an inbound transaction from another SoC.

9. The SoC of claim 1, wherein:
    the SoC is connected to one or more additional SoCs following a daisy chain topology such that the SoC is connected in sequence to the one or more additional SoCs, and
    the SoC is configured to automatically identify a connection to the one or more SoCs as a daisy chain topology.

10. The SoC of claim 9, wherein
    the SoC is connected in sequence to two additional SoCs,
    the root complex is further configured to communicate directly with a multi-function endpoint in a first additional SoC, and
    the multi-function endpoint is further configured to communicate directly with a root complex in a second additional SoC.

11. A device comprising:
    a plurality of system-on-chips (SoCs), each respective SoC comprises:
        a processor;
        a local memory;
        a root complex operably connected to the processor and the local memory and configured to:
            obtain forwarding information to configure routing of transactions to one or more peripheral component interface express (PCIe) endpoint functions or to the local memory, and
            initialize, based on the forwarding information, access between a host and the one or more PCI endpoint functions; and
        a multi-function endpoint controller configured to:
            obtain a descriptor and endpoint information to configure outbound portals for transactions to at least one remote host, and
            establish a communication path between the host and a function out of a plurality of functions.

12. The device of claim 11, wherein the descriptor comprises a PCI address and a plurality of PCI attributes indicating whether a transaction is directed to the one or more PCI endpoint functions or the local memory.

13. The device of claim 12, each respective SoC further comprising:
    a centralized transaction tunneling unit configured to translate the PCI address to a local address that directs a forwarding direction of the transaction in the SoC; and
    an interconnect configured to provide the PCI address from the root complex to the centralized transaction tunneling unit.

14. The device of claim 13, each respective SoC further comprising an outbound address translation unit (ATU) configured to translate the local address to the PCI address received from the host when the descriptor associates the transaction to another SoC.

15. The device of claim 13, wherein the centralized transaction tunneling unit is further configured to:
identify, via the centralized transaction tunneling unit, a local attribute in the PCI address, and
forward, based on the local attribute and the local address, the transaction to the local memory.

16. The device of claim 13, wherein the centralized transaction tunneling unit is further configured to:
identify, via the centralized transaction tunneling unit, a local attribute in the PCI address, and
forward, based on the local attribute and the local address, the transaction to the multi-function endpoint controller.

17. The device of claim 11, wherein:
each respective SoC is configured to provide the plurality of functions to the host,
each respective SoC includes an outbound address space corresponding to PCI addresses provided by the host, and
each respective SoC is configured to partition the outbound address space such that each function out of the plurality of functions provided by the controller is assigned a partition in the outbound address space.

18. The device of claim 11, wherein:
each respective SoC is connected to one another following a daisy chain topology such that each respective SoC is connected in sequence,
each respective SoC is connected in sequence to two additional SoCs,
the root complex of each respective SoC is further configured to communicate directly with a multi-function endpoint in a first additional SoC, and
the multi-function endpoint each respective SoC is further configured to communicate directly with a root complex in a second additional SoC.

19. A method comprising:
obtaining, by a root complex operably connected to a processor and a local memory, forwarding information to configure routing of transactions to one or more peripheral component interface express (PCIe) endpoint functions or to the local memory;
initializing, by the root complex and based on the forwarding information, access between a host and the one or more PCI endpoint functions;
obtaining, by a multi-function endpoint, a descriptor and endpoint information to configure outbound portals for transactions to at least one remote host; and
establishing a communication path between the host and a function out of a plurality of functions,
wherein the descriptor comprises a PCI address and a plurality of PCI attributes indicating whether a transaction is directed to the one or more PCI endpoint functions or the local memory.

20. The method of claim 19, further comprising:
translating, via a centralized transaction tunneling unit, a PCI address to a local address;
providing, via an interconnect, the PCI address from the root complex to the centralized transaction tunneling unit;
identifying, via the centralized transaction tunneling unit, a local attribute in the PCI address; and
forwarding, via the centralized transaction tunneling unit and based on the local attribute, the local address to the local memory or to the multi-function endpoint controller.

* * * * *